United States Patent [19]

Pfeifer et al.

[11] 4,047,777
[45] Sept. 13, 1977

[54] KNOCKDOWN PUT-TOGETHER ARTICLE OF FURNITURE

[76] Inventors: Raymond Pfeifer, 5530 S. Lake Shore Drive, Chicago, Ill. 60616; Roger Ringger, 7480 SW. Fifth St., Plantation, Fla. 33566

[21] Appl. No.: 630,434

[22] Filed: Nov. 10, 1975

[51] Int. Cl.² .................................................. E04C 1/10
[52] U.S. Cl. .................................. 312/263; 312/265; 52/586
[58] Field of Search .................. 312/263, 257 A, 265, 312/263, 140, 111; 108/157, 153; 52/753 E, 753 D, 753 C, 757

[56] References Cited

U.S. PATENT DOCUMENTS

| | | | |
|---|---|---|---|
| 1,934,644 | 11/1933 | Rand | 312/263 |
| 2,470,514 | 5/1949 | Muller | 52/753 E |
| 2,962,334 | 11/1960 | Dutmers | 312/265 |
| 3,170,201 | 2/1965 | Nofziger | 52/753 E |
| 3,229,029 | 1/1966 | Weiss | 312/263 |
| 3,261,493 | 7/1966 | Smith | 52/753 D |
| 3,535,204 | 10/1970 | Truxa | 52/586 X |
| 3,722,431 | 3/1973 | Howard | 108/153 |
| 3,759,553 | 9/1973 | Carter | 285/305 |
| 3,784,273 | 1/1974 | Nikolai | 312/263 |
| 3,885,845 | 5/1975 | Krieks | 312/265 |

*Primary Examiner*—Paul R. Gilliam
*Assistant Examiner*—Victor N. Sakran
*Attorney, Agent, or Firm*—Arnstein, Gluck, Weitzenfeld & Minow

[57] ABSTRACT

A knockdown, put-together article of furniture, such as a dresser, cabinet, desk and the like, in which the parts can be packaged and shipped in a knocked-down disassembled condition and readily assembled by the use of U-shaped wire interlocking members. The spaced sides each have adjacent the upper end, oppositely facing horizontal grooves which cooperate with spaced inwardly facing grooves formed in a channel on the underside of a top.

A U-shaped interlocking pin is inserted into said cooperating grooves to interlock the top to the sides. The sides have means for slidably supporting a drawer.

The sides have a horizontal channel with spaced inwardly facing grooves which cooperate with oppositely positioned horizontal grooves adjacent the sides of the bottom. The last mentioned grooves being interlocked by a U-shaped wire interlocking member to secure the bottom to the sides. The sides, top and bottom have channels for securing a back or rear wall in a locked position.

6 Claims, 12 Drawing Figures

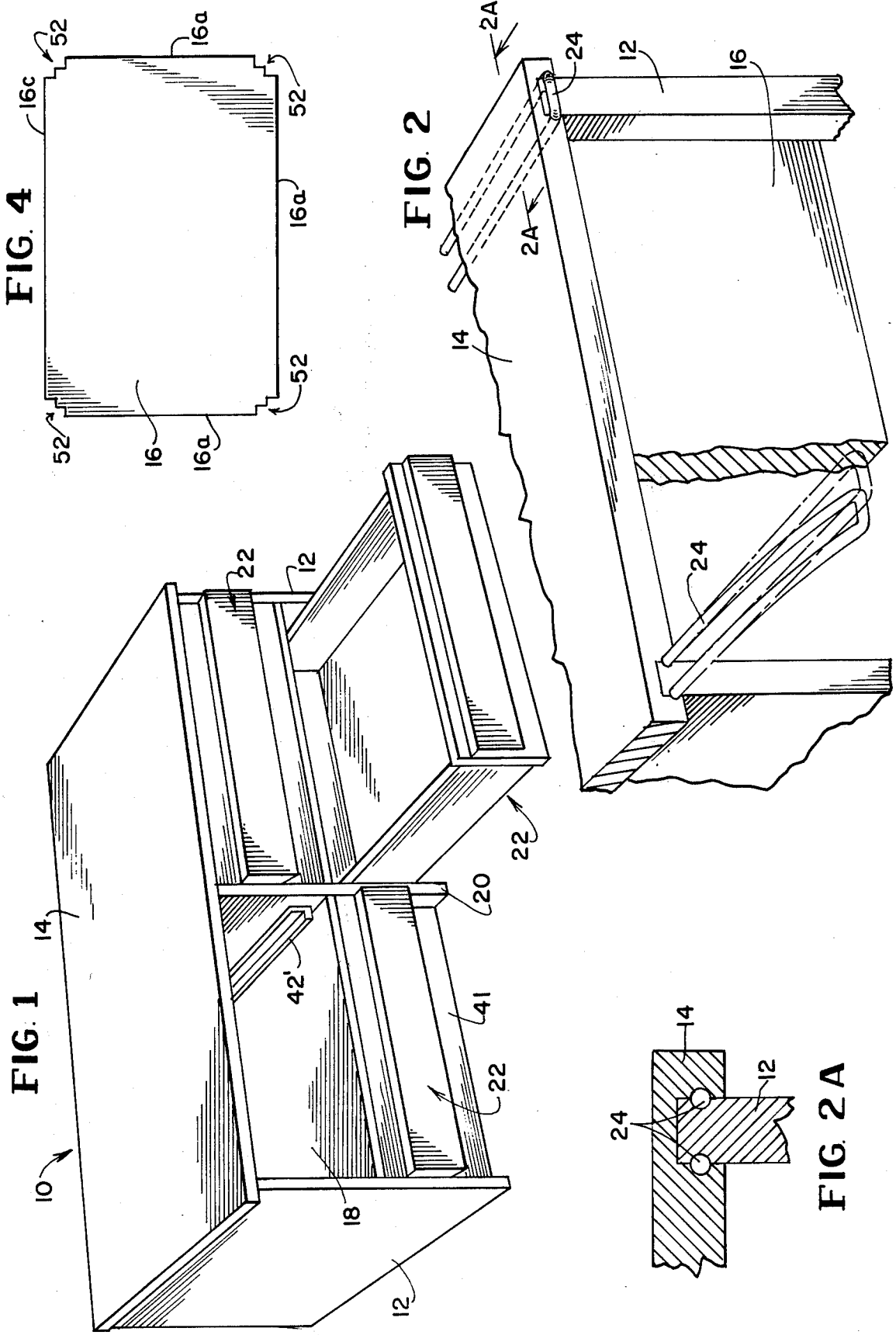

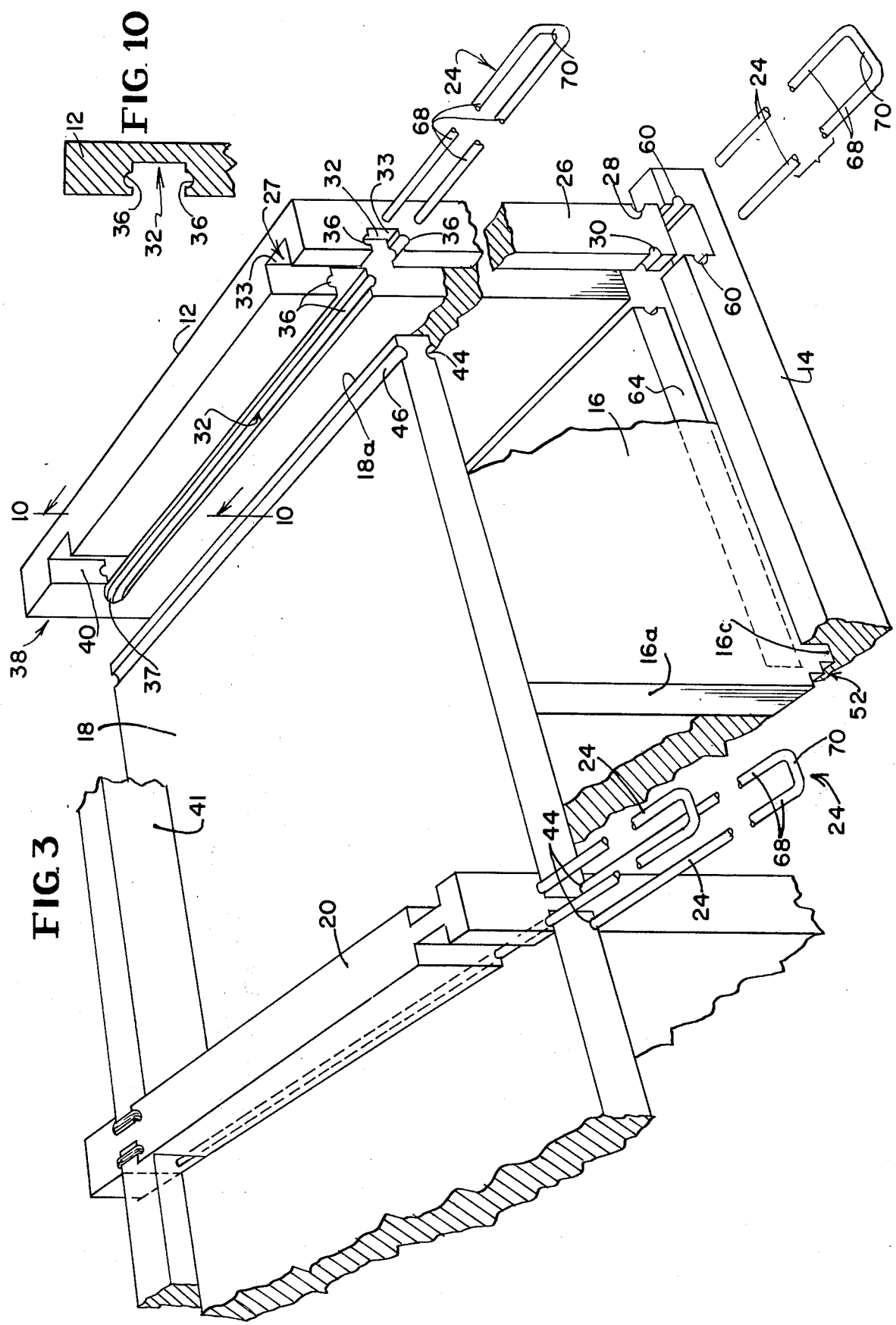

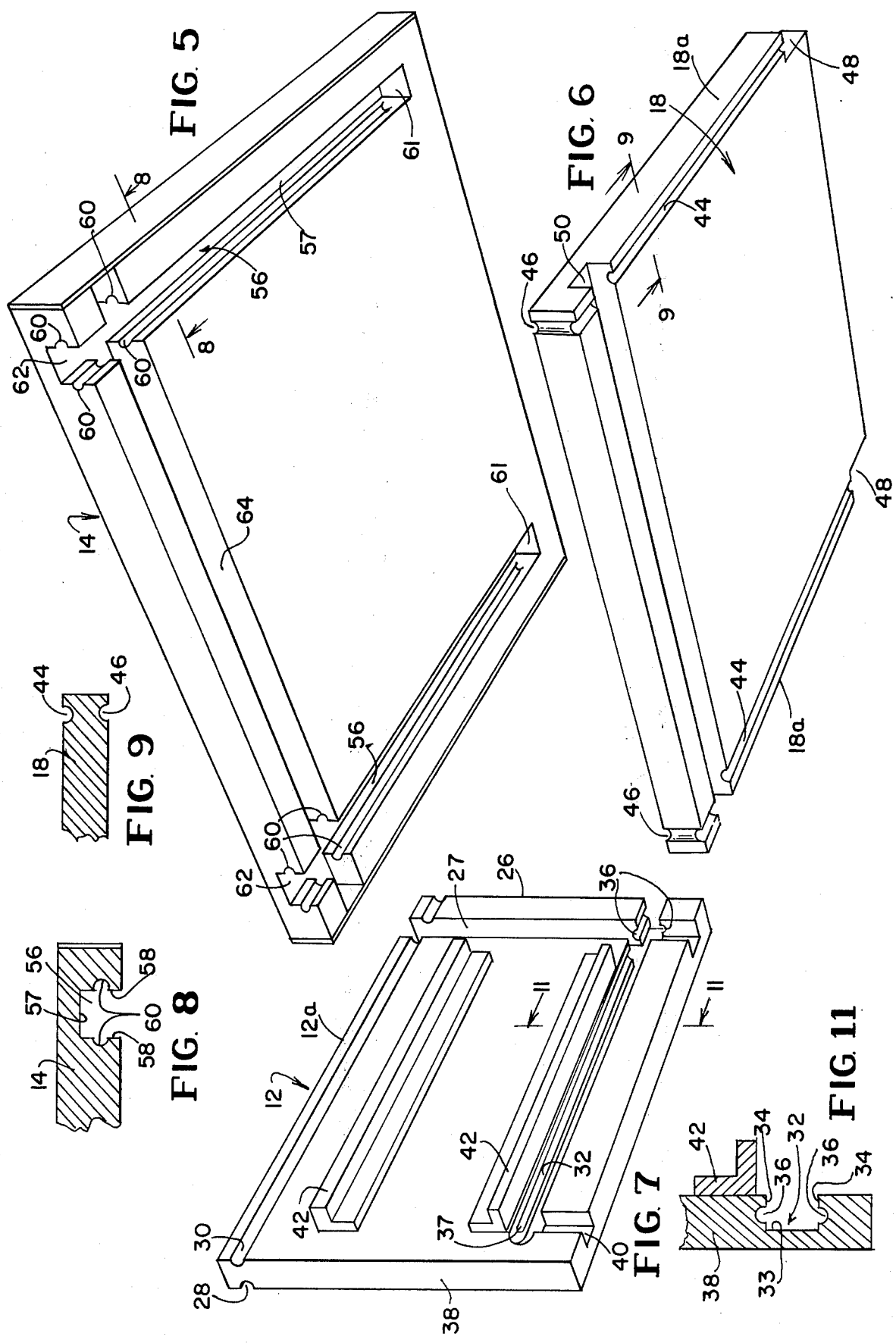

KNOCKDOWN PUT-TOGETHER ARTICLE OF FURNITURE

BRIEF SUMMARY OF THE INVENTION

One of the objects of this invention is to provide an article of furniture, such as a dresser, cabinet, desk and the like, which is made up of parts which can be packaged and shipped in a knocked-down disassembled condition and which may be readily and easily assembled with interlocking means which are readily insertable in the assembled parts without the use of tools or the like and when inserted, serve to interlock the parts and retain them in a rigid position. If desired, the interlocking means may be removed and the parts can again be disassembled.

With this invention the disassembled parts of the article of furniture may be shipped and stored to occupy a minimal space resulting in economy in shipping and storing and yet may be readily assembled by inexperienced persons.

BRIEF DESCRIPTION OF THE DRAWINGS

FIG. 1 is a view of an article of furniture, such as a dresser or the like, with the parts in assembled relation and showing one of the drawer spaces unoccupied and another drawer partially pulled out.

FIG. 2 is a fragmentary rear view of the cabinet or dresser showing the interlocking pin on the right side in interlocked position and showing another interlocking pin ready for insertion.

FIG. 2A is a sectional view taken on lines 2A—2A of FIG. 2.

FIG. 3 is an exploded view of the parts in inverted position to illustrate the assembling of the parts.

FIG. 4 is a reduced plan view of the back.

FIG. 5 is an underside view of the top.

FIG. 6 is a view of the bottom, same being shown in inverted position for clarity.

FIG. 7 is a view of one of the sides as viewed from the inside thereof.

FIG. 8 is a sectional view taken on line 8—8 of FIG. 5.

FIG. 9 is a sectional view taken on line 9—9 of FIG. 6.

FIG. 10 is a sectional view taken on line 10—10 of FIG. 3.

FIG. 11 is a sectional view taken on line 11—11 of FIG. 7.

DESCRIPTION OF THE PREFERRED EMBODIMENTS

While the invention herein is illustrated in the form of a dresser or cabinet which supports slidable drawers, it will be understood that the invention is applicable and can be used in forming and assembling other articles of furniture, such as desks, filing cabinets and other article of furniture too numerous to mention.

The dresser or cabinet illustrated is generally indicated at 10 and comprises, when assembled, a pair of sides 12, a top 14, a rear or back 16, a bottom 18 and an intermediate vertical wall 20 which serves the same purpose as the sides 12 but which divides the cabinet or dresser to retain a greater number of slidable drawers generally indicated at 22. The parts, as will be hereinafter set forth, are provided with undercuts or rabbets or channels and some with grooves formed in such a manner that the parts are interfitted and are connected by means of the U-shaped connecting or interlocking members generally indicated at 24, all of which connecting or interlocking members are of similar construction.

Each of the two sides 12 are similarly constructed and a description of one will suffice to describe both sides which will have identical part designations. The intermediate vertical wall member 20, which will be separately described, is similar in construction to the two opposite sides 12 except that the opposite faces of the intermediate vertical wall 20 are duplicated so that whereas each of the opposite sides 12 has inwardly facing grooves and channels, the intermediate wall will have such similar grooves and channels on each of its opposite faces as will be understood.

The side 12 (FIGS. 3, 7) is provided adjacent the rear 26 with a vertically extending, inwardly facing undercut or channel indicated at 27 which undercut or channel extends the height of the side wall. The channel 27 is adapted to receive one of the opposite side ends 16a of the back 16. The side 12 has adjacent the top a horizontally extending, outwardly facing groove 28 and a horizontally extending, inwardly facing groove 30. Spaced from the bottom of the side 12 is a horizontally extending, inwardly facing undercut or channel generally indicated at 32 (FIGS. 7 and 11), providing an inner end wall 33 and spaced inwardly facing side walls 34. Each of the spaced side walls 34 has an inwardly facing, horizontal groove 36. The grooves 36 are diametrically opposite and face each other. The grooves 36 receive the U-shaped interlocking member 24. The channel 32 is adapted to receive one of the opposite side ends 18a of the bottom 18 when the bottom is interlocked with the sides. The horizontal channel 32 is closed by a rounded end 37 adjacent the front 38 (FIG. 7); however, it is open at the rear. The side 12, adjacent the front, has a short vertical recess or channel 40 which communicates with the horizontal channel 32 and said vertical channel 40 is adapted to receive the end of the bottom cross strip or trim 41 as will be subsequently described. The side 12 is provided with a plurality of spaced, horizontally positioned, L-shaped rails 42 which are secured to the side 12. The pair of rails 42 are inverted with respect to each other and each pair of rails on each side is adapted to receive and slidably support a drawer 22. As shown in FIG. 1, the upper compartment to the left is shown free so that it may receive a drawer similar to those shown.

The intermediate vertical wall 20, a portion of which is shown in FIG. 3, is formed similar to side 12 already described, but in addition thereto has on its opposite facing side all the channels, grooves and rails identical to those described in connection with side 12, as the intermediate vertical wall 20 is to be interlocked with the other wall members of the unit by the interlocking members 24. The details of the intermediate vertical wall 20 are therefore not re-described.

The bottom member, generally indicated at 18 (FIGS. 3, 6 and 9), is formed with an upwardly facing horizontal groove 44 adjacent each of its opposite sides and with a downwardly facing horizontal groove 46 adjacent each of its sides, which pairs of grooves on each side are aligned. The front corners of the bottom 18 each have a right-angled cutout or recess 48 which, when assembled to the sides 12 or intermediate vertical wall 20, abuts adjacent the front rounded ends 37 of the channel 32 of the side 12. Adjacent the rear of the bottom is a horizontally extending, upwardly facing channel 50 which extends from one end to the other. This channel receives the lower edge 16b of the back or rear wall 16. Each of the opposite sides 18a of the bottom 18 is adapted to fit into the horizontal channel 32 in the side 12 and the oppositely facing grooves 44 and 46 in the bottom 18 will then be in alignment with the inwardly facing grooves 36 in the side 12 or in the intermediate vertical wall 20 and the parts would then be in position to receive the free end of the U-shaped interlocking member 24 which is inserted into said cooperating grooves through the rear and when the interlocking member 24 is inserted, the sides 12 are secured to the bottom wall 18.

The back or rear wall 16 (FIG. 4) has at each of the corners a pair of right angled cutouts 52 which are aligned with grooves to permit passage of the interlocking member 24. The opposite side ends 16a of the back wall are adapted to fit within the rear vertical channels 27 in the sides 12 and the corner cutouts 52 would align with the horizontal grooves so that when the interlocking members 24 are inserted in said horizontal grooves, they pass the cutouts 52 in the corners of the back wall 16.

The underside of the top 14 (FIGS. 5 and 8) is provided with an inwardly facing undercut or channel 56 adjacent each of its sides. The channel has an inner end wall 57 and spaced side walls 58. Each of the spaced side walls of said undercut has an inwardly facing horizontal groove 60. The diametrically opposed grooves 60 face each other. The front end of the channel 56 is closed as at 61 with the rear end 62 open. The channels 56 on the underside of the top 14 are adapted to receive the upper ends 12a of the sides 12 and the grooves 28 and 30 in the sides 12 register with the opposed grooves 60 in the channel 56 in the top 14. The U-shaped interlocking member 24 is inserted into said cooperating grooves through the rear so that when fully inserted, the sides 12 are interlocked to the top 14.

Adjacent the rear of the top 14 on the underside thereof is a horizontally extending channel 64 which, when the top 14 is secured to the sides 12, is in alignment with the rear vertical channels 27 of the sides 12. The top rear horizontal channel 64 is adapted to receive the upper end 16c of the back member 16. When the back member is secured in position in its respective channels, the cutouts 52 at the corners are in alignment with the grooves so that the U-shaped interlocking member 24 can pass unimpeded through the back 16 and into the grooves for connecting the parts together.

FIG. 1 shows compartments for receiving a pair of slidable drawers on each side of the intermediate vertical wall 20. Accordingly, the lower compartments on each side would also have a bottom similar to the bottom 18 described and similarly constructed with similar grooves to be interlocked with lower horizontal grooves in the sides and in the intermediate wall. The space below the lower bottom wall has a strip like 41 which may be secured to the lower bottom wall 18 by any fixture so that it extends to the floor and covers what might otherwise be the open space below the bottom drawer.

The U-shaped interlocking members or sometimes referred to herein as interlocking pins are generally indicated at 24, are all alike and each is formed of a single strip of wire, bent to form a pair of spaced sides 68 connected at one end by a straight connecting portion 70 with the opposite or front ends of the sides 68 being free for insertion into the grooves and channels heretofore described for connecting the disassembled parts. The U-shaped interlocking members or interlocking pins are made of substantially rigid wire and the spaced sides 68 have a slight outward bow or bend to provide any preload or set to ensure proper tensioning or tightness when same are inserted into the grooves as previously described.

The parts forming the article of furniture are made preferably of wood or any kind of composition material. It is understood that the parts may be made of plastic or any other material.

All of the parts named, the sides, back, front, top, are in a disassembled condition and are put together in the manner heretofore described, but will be briefly re-described.

ASSEMBLY

If the article of furniture is formed to support one tier of slidable drawers 22, then the sides 12 are spaced apart and the opposite sides 18a of a bottom 18 are inserted in the horizontal channels 32 of the sides 12 and a lower bottom like 18 would likewise be positioned in the lower horizontal channels like channels 32 of the sides 12. The inwardly facing horizontal grooves 36 in the channel 32 of the side 12 being aligned with the oppositely facing grooves 44 and 46 adjacent the side ends 18a of the bottom 18. The back 16 is vertically positioned so that its opposite side ends 16a are each received in the rear vertical channels 27 of the sides 12. The lower corner cutouts 52 of the back would be aligned with the grooves 44, 46 and the two grooves 36. The U-shaped interlocking pins 24 are then inserted from the rear horizontally into the grooves 44, 46 and two grooves 36 to interlock the sides 12 to the bottom 18. The front or free ends of the pins 24 enter the grooves and the rear connecting portion 70 of the pin 24 would rest against the rear of the side 12, back 16 and bottom 18. The same would be applicable to the lower bottom so that he two bottoms, the upper and lower bottoms, would be interlocked with the two sides. If, of course, it is desired to form a tier of three or more compartments for drawers, then the additional longitudinal channels and grooves are formed in the sides, and similarly interlocked with an additional bottom member.

The top 14 is secured by positioning the horizontal, inwardly facing channel 56 on the underside of the top on the top edges 12a of the sides 12 and the opposed inwardly facing grooves 60 of the top channel 56 will be aligned with the oppositely facing grooves 28, 30 in the top of the sides 12. A U-shaped interlocking pin 24 is positioned into said cooperating grooves through the rear so that the interlocking pin extends horizontally to interconnect the parts. The upper corner cutouts 52 of the back 16 will be in registry with the grooves to permit insertion of the interlocking pins 24. The top 14, sides 12 and back 16 will thus be interlocked, while the interlocking pins 24 previously inserted will interlock the bottom, sides and back. Thus, the components forming the cabinet or the like are firmly and rigidly secured together and interlocked. The interlocking pins 24 are of a length to extend the length of the grooves into which they fit so that the connections extend from the front to the rear of the cabinet which provides a firm and rigid connection.

To assemble a cabinet which utilizes an intermediate vertical panel like 20, which is shown in FIG. 1 and shown in disassembled view in FIG. 3, the same procedure is followed except that the intermediate panel has the rear vertical grooves adjacent the rear on both sides, as shown at the front of FIG. 3, and that the horizontally extending lower channel like channel 32 with the cooperating grooves 36 likewise extend on both sides of the intermediate panel and the drawer guideways 42 are positioned on both sides of the intermediate panel instead of on the inner side as were the sides 12 forming the opposite ends of the cabinet.

It will be noted that the U-shaped connecting pins 24, which connect the top 14 to the sides 12, while extending horizontally into the cooperating grooves, are positioned so that the two sides 68 of the same pin are on the same horizontal plane, i.e. side by side, whereas the connecting pins 24, which connect the bottom 18 to the sides 12, also extend horizontally into the cooperating grooves but are positioned so that the two sides 68 of the pin are positioned one above the other, namely in a vertical plane.

It will be noted that each U-shaped pin 24 engages four cooperating grooves for the full length of each cooperating groove thereby providing a fastening or interlocking along the entire length of the sides 12 or intermediate wall 20 with the top 14 and bottom 16 thus providing a positive and rigid and firm interlock.

What is claimed is:

1. A knockdown, put-together article of furniture comprising a pair of spaced side members and a top, each of said spaced side members having a horizontally extending groove adjacent the upper end thereof and on each of the opposite sides of each said side members, said grooves extending substantially from the front to the rear of the side members, said top having an inwardly or downwardly facing channel adjacent the side edges thereof to receive the upper end of said side member, each said channel having spaced opposite sides, said top inwardly facing channels each having a longitudinal groove on each of the spaced opposite sides which grooves extend substantially from the front to the rear of the top and align and cooperate with the grooves in the side member when the upper end of a said side member is positioned within said channel to form at least four cooperating and aligned grooves, a U-shaped non-threaded integrally formed interlocking member having spaced generally parallel sides of a length to extend substantially the length of the cooperating grooves and a connecting end portion with said spaced parallel sides of said interlocking member slidably insertable into said cooperating grooves to simultaneously engage said four cooperating grooves to interlock the top to said side members and with said connecting end portions engaging the end of said side member to limit the insertion of said U-shaped interlocking member each of the side members having a horizontally extending, inwardly facing channel and inwardly facing grooves in said channel, a bottom having its opposite ends secured in said horizontal channel, said bottom having cooperating grooves which are aligned with the grooves in the side channel and a U-shaped interlocking member insertable into said cooperating grooves to lock said bottom to said sides.

2. A knockdown, put-together article of furniture as set forth in claim 1 in which the side members have a vertical channel adjacent the rear thereof, a rear panel secured in said vertical channel.

3. A knockdown, put-together article of furniture as set forth in claim 1 in which each of the spaced side members has a horizontal inwardly and outwardly facing groove adjacent the upper end which are aligned and in which the downwardly facing channel is on the underside of the top and said top channel has a pair of inwardly facing grooves and in which the U-shaped interlocking member is insertable to simultaneously engage the two grooves on the side member and the two grooves in the top channel to interlock the top to the side members.

4. A knockdown, put-together article of furniture as set forth in claim 3 in which the side members have means for receiving a slidable drawer and in which the U-shaped interlocking member is formed of a single strip of rigid wire with the spaced sides of said interlocking member having a slight outward bow or bend to ensure tensioning when in the grooves.

5. A knockdown put-together article of furniture as set forth in claim 3 in which each of the side members has a horizontally extending, inwardly facing channel and a pair of inwardly facing grooves in said last mentioned channel, a bottom having its opposite ends secured in said last mentioned channel, said bottom having oppositely facing horizontal grooves which align with said pair of inwardly facing grooves, a U-shaped interlocking pin engaging each such four cooperating grooves to interlock said bottom to said side members.

6. A knockdown put-together article of furniture as set forth in claim 3 in which the top has an intermediate downwardly facing channel on the underside of the top and said last mentioned channel has a pair of inwardly facing grooves and in which an intermediate vertical panel has its upper end positioned in said top channel and said intermediate vertical panel has opposed horizontal grooves adjacent its upper end which cooperate with the groove in the intermediate top channel and in which a generally U-shaped interlocking means is insertable into said cooperating grooves to lock said intermediate panel to said top.

* * * * *

UNITED STATES PATENT OFFICE
CERTIFICATE OF CORRECTION

PATENT NO. : 4,047,777
DATED : September 13, 1977
INVENTOR(S) : Raymond Pfeifer and Roger Ringger It is certified that error appears in the above-identified patent and that said Letters Patent are hereby corrected as shown below:

IN CLAIM 1:

Column 5, lines 33 and 34, "member" should be --members--.
Column 5, line 39, "a" should be deleted.
Column 5, line 50, "portions" should be --portion--.
Column 5, line 52, a --comma-- should be inserted after "member".

Signed and Sealed this

Third Day of January 1978

[SEAL]

Attest:

RUTH C. MASON
Attesting Officer

LUTRELLE F. PARKER
Acting Commissioner of Patents and Trademarks